(12) United States Patent  
Imazu

(10) Patent No.: US 10,283,988 B2  
(45) Date of Patent: May 7, 2019

(54) ELECTRONIC APPARATUS

(71) Applicant: CANON KABUSHIKI KAISHA, Tokyo (JP)

(72) Inventor: Hiroo Imazu, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 142 days.

(21) Appl. No.: 15/237,305

(22) Filed: Aug. 15, 2016

(65) Prior Publication Data

US 2017/0063120 A1    Mar. 2, 2017

(30) Foreign Application Priority Data

Aug. 24, 2015   (JP) ................... 2015-164470

(51) Int. Cl.
  *H02J 7/00*   (2006.01)

(52) U.S. Cl.
  CPC .......... *H02J 7/0052* (2013.01); *H02J 7/0063* (2013.01); *H02J 7/0068* (2013.01); *H02J 2007/0062* (2013.01)

(58) Field of Classification Search
  CPC ....... H02J 7/0052; H02J 7/0063; H02J 7/0068
  USPC ................ 320/107, 152, 157, 159
  See application file for complete search history.

(56) References Cited

U.S. PATENT DOCUMENTS

| | | | |
|---|---|---|---|
| 7,518,343 B2 | 4/2009 | Veselic | |
| 2004/0239294 A1 | 12/2004 | Veselic | |
| 2006/0139005 A1* | 6/2006 | Niculae | H02J 7/0013 320/132 |
| 2014/0184897 A1* | 7/2014 | Degura | H02J 7/0068 348/372 |

FOREIGN PATENT DOCUMENTS

JP    2007-20398 A    1/2007

* cited by examiner

*Primary Examiner* — Zixuan Zhou  
(74) *Attorney, Agent, or Firm* — Canon U.S.A., Inc. IP Division

(57) ABSTRACT

An electronic apparatus includes a power receiving unit that receives power from an external apparatus connected to an interface unit, a first generating unit that generates a first control signal, a second generating unit that generates a second control signal, a third generating unit that generates a third control signal, a fourth generating unit that generates a fourth control signal using the first to third control signals, a charge control unit that charges a battery with power received from the external apparatus when the fourth control signal is in a low state, and that stops charging the battery when the fourth control signal is in a high state, and a power supply unit that starts supplying power from the battery to the second generating unit when the fourth control signal is changed into a high state.

19 Claims, 5 Drawing Sheets

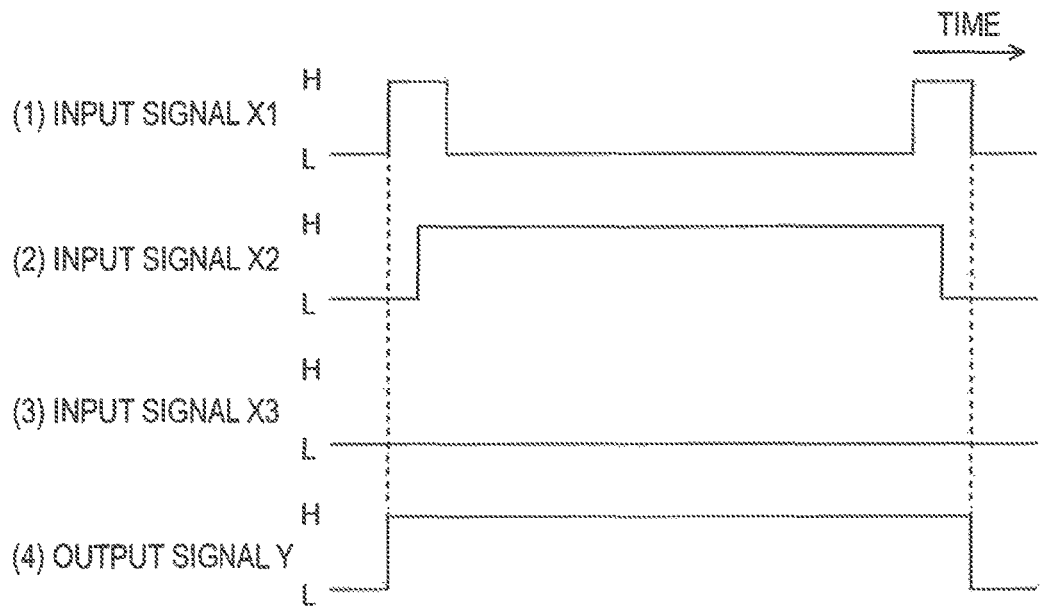
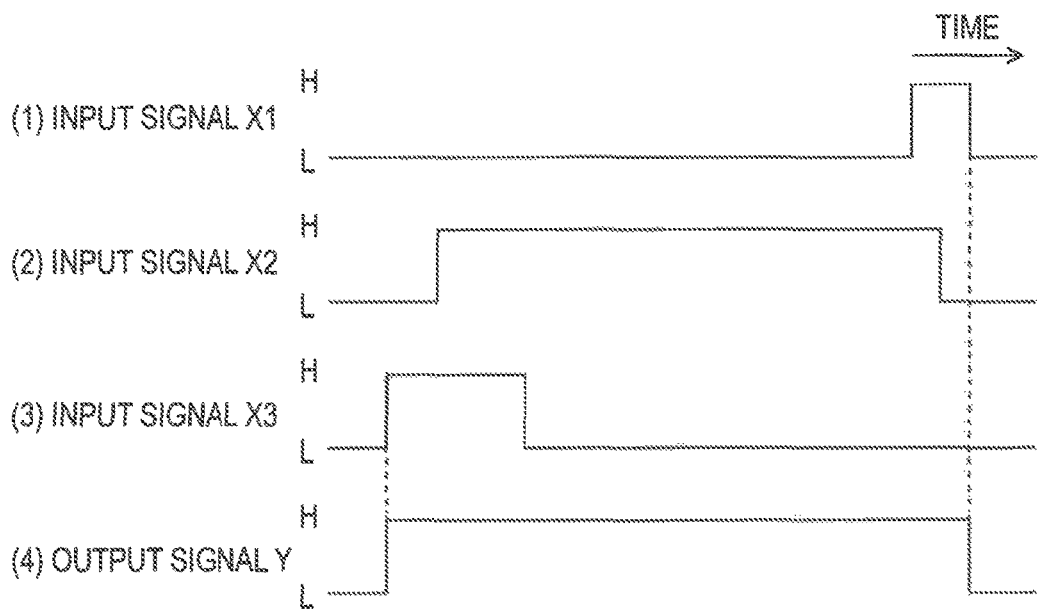

ELECTRONIC APPARATUS

BACKGROUND

Field

Aspects of the present invention generally relate to an electronic apparatus capable of charging a battery, and the like.

Description of the Related Art

In Japanese Patent Laid-Open No. 2007-20398, there is described a technique with which an electronic apparatus performs an enumeration using power supplied from an external apparatus through a universal serial bus (USB) cable.

However, with the technique described in Japanese Patent Laid-Open No. 2007-20398, there can be a case where, when a power supply ability of the external apparatus is insufficient or instable, a system failure occurs in the electronic apparatus so that the electronic apparatus cannot complete the enumeration normally. When the electronic apparatus cannot complete the enumeration normally, the electronic apparatus cannot be supplied with larger power (for example, current: a maximum of 500 mA, voltage: 5 V) from the external apparatus. When the electronic apparatus cannot be supplied with larger power from the external apparatus, the electronic apparatus cannot shorten charging time of a battery connected thereto.

SUMMARY

According to an aspect of the present invention, an electronic apparatus can normally complete an enumeration in accordance with a universal serial bus (USB) standard.

According to an aspect of the present invention, an electronic apparatus can be supplied with larger power (for example, current: a maximum of 500 mA, voltage: 5 V) from an external apparatus.

According to an aspect of the present invention, an electronic apparatus can shorten charging time of a battery.

According to an aspect of the present invention, an electronic apparatus includes a power receiving unit that receives power from an external apparatus connected to an interface unit, a first generating unit that generates a first control signal, a second generating unit that generates a second control signal, a third generating unit that generates a third control signal, the third control signal being changed into a high state when an output voltage of a battery is greater than a reference voltage, a fourth generating unit that generates a fourth control signal using the first control signal, the second control signal, and the third control signal, the fourth control signal being changed into a high state when the first control signal, the second control signal, or the third control signal is changed into a high state, a charge control unit that charges the battery with power received from the external apparatus when the fourth control signal is in a low state, and that stops charging the battery when the fourth control signal is in a high state, and a power supply unit that starts supplying power from the battery to the second generating unit when the fourth control signal is changed into a high state, wherein when the fourth control signal is changed into a high state and supply of power from the battery to the second generating unit is started, the second generating unit performs a process for changing the electronic apparatus into a power on state from a power off state.

Further features and aspects of the present invention will become apparent from the following description of exemplary embodiments.

BRIEF DESCRIPTION OF THE DRAWINGS

FIG. 4 is a timing chart for explaining an example of a relationship between a control signal input to a control signal selection unit 305 and a control signal output from the control signal selection unit 305.

FIG. 5 is a timing chart for explaining another example of the relationship between a control signal input to the control signal selection unit 305 and a control signal output from the control signal selection unit 305.

DESCRIPTION OF THE EMBODIMENTS

Exemplary embodiments, features, and aspects of the present invention will be described below with reference to the drawings. However, aspects of the present invention are not limited to the following embodiments.

First Embodiment

Figure 1A:
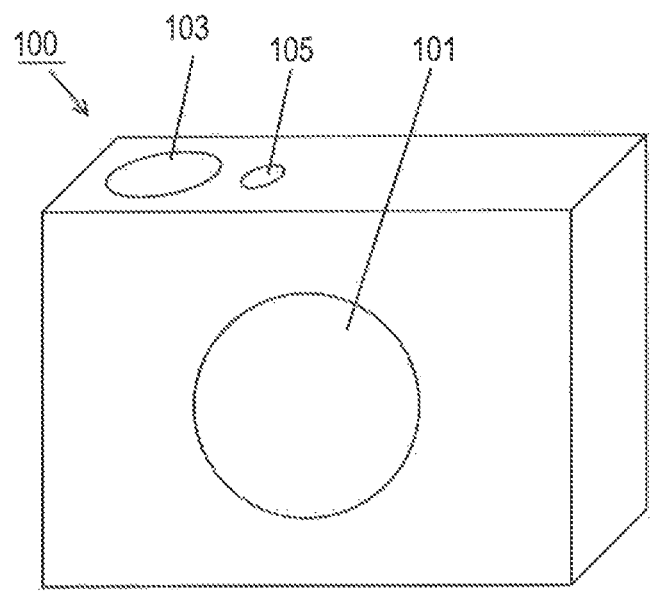
FIGS. 1A and 1B are views illustrating an example of appearance of an electronic apparatus 100 according to a first embodiment.
Figure 1B:
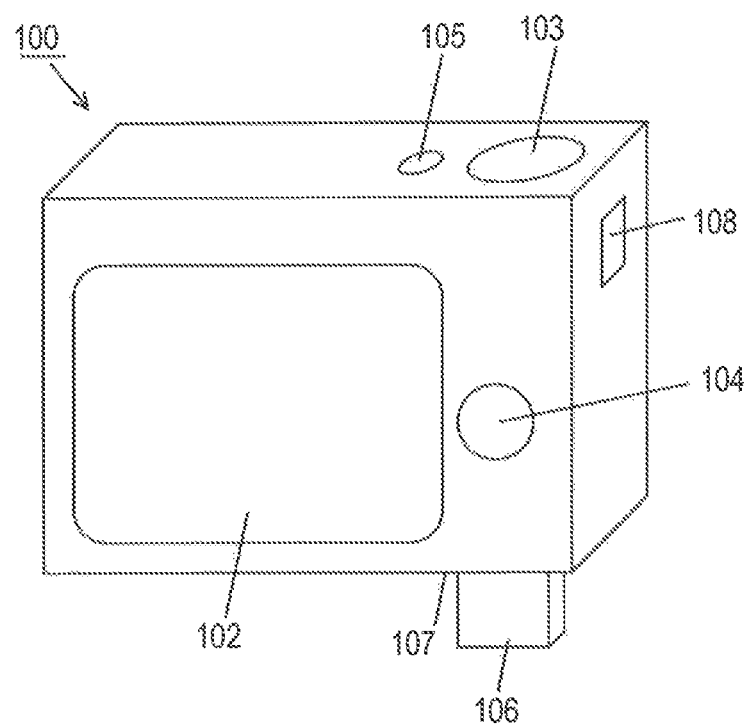

FIGS. 1A and 1B are views illustrating an example of appearance of an electronic apparatus 100 according to a first embodiment. FIG. 1A is an example of a front view of the electronic apparatus 100. FIG. 1B illustrates an example of a back view of the electronic apparatus 100. The electronic apparatus 100 acts, for example, as an image capture apparatus or a cellular phone. A digital camera is an example of the image capture apparatus. A cellular phone with camera is an example of the cellular phone.

An image capture optical system 101 includes a lens and a shutter, and focuses an optical image of a subject on a light-receiving surface of an image capture element (such as a CCD sensor). A display unit 102 includes a display device such as a liquid crystal display, and displays an image and a variety of information. A shutter button 103 is an instruction unit for providing a capture instruction. An instruction input unit 104 is configured to be able to input various instructions from a user to the electronic apparatus 100. A power switch 105 is a switch for switching the electronic apparatus 100 to a power on state or a power off state. A battery 106 is a chargeable battery. When stored in a battery storage unit 107, the battery 106 is connected to the electronic apparatus 100. A USB interface unit 108 is a communication interface in accordance with a universal serial bus (USB) standard. The USB interface unit 108 can be connected to an external apparatus through a USB cable. The external apparatus connected to the USB interface unit 108 acts as a host apparatus or a power supply apparatus. For example, in a case where the external apparatus is a personal computer, the external apparatus acts as the host apparatus. For example, in a case where the external apparatus is an AC adapter, the external apparatus acts as the power supply apparatus.

Figure 2:
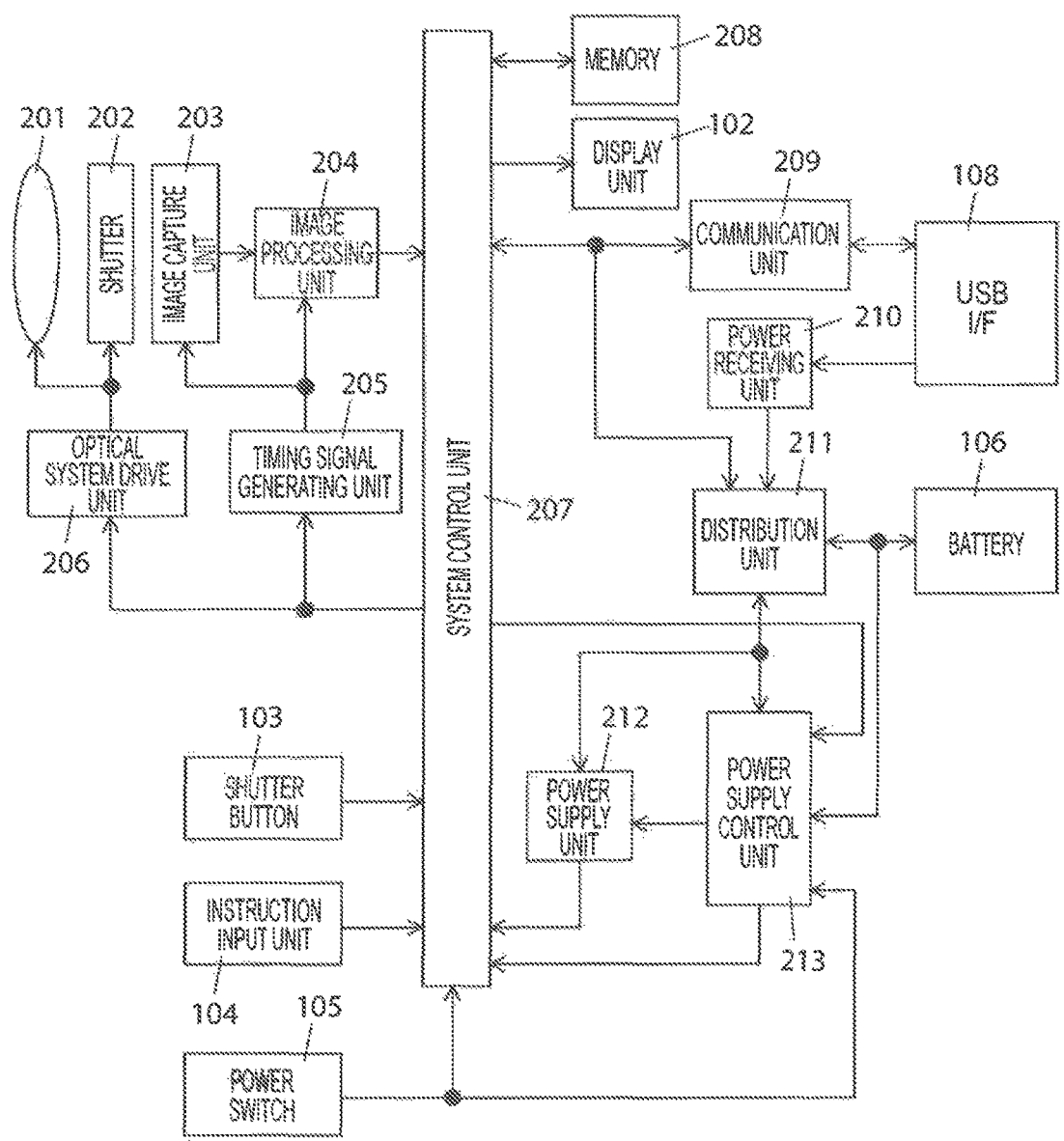
FIG. 2 is a block diagram for explaining an example of components included in the electronic apparatus 100 according to the first embodiment.

FIG. 2 is a block diagram for explaining an example of components included in the electronic apparatus 100 according to the first embodiment. A part of the components included in the electronic apparatus 100 has a hardware configuration.

The image capture optical system 101 includes a lens unit 201 and a shutter 202. An image capture unit 203 includes an image capture element (such as a CCD sensor) which converts an optical image into an electric signal, and outputs an electric signal generated in the image capture element. An image processing unit 204 generates digital image data (the digital image can be either a still image or a motion image) from the electric signal output from the image capture unit 203. The image processing unit 204 includes a correlated double sampling circuit, a programmable gain amplifier capable of setting a desired amplification, and an A/D converter which converts an analog signal into a digital signal. A timing signal generating unit 205 generates a timing signal which activates the image capture unit 203 and the image processing unit 204. An optical system drive unit 206 drives each of the lens unit 201 and the shutter 202.

A system control unit 207 can control each component included in the electronic apparatus 100. The system control unit 207 writes digital image data generated in the image processing unit 204 in a memory 208. The system control unit 207 generates reduced image data from the digital image data generated in the image processing unit 204, and writes the reduced image data in the memory 208. The memory 208 stores the digital image data generated in the image processing unit 204 and the reduced image data generated in the system control unit 207. The memory 208 has a sufficient capacity of the storage unit for storing a predetermined number of still images, or motion images of a predetermined period of time. The system control unit 207 supplies the reduced image data stored in the memory 208 to the display unit 102. The reduced image data written in the memory 208 is thus displayed on the display unit 102.

The shutter button 103, the instruction input unit 104, and the power switch 105 act as an instruction unit used for inputting an instruction from a user to the system control unit 207. When the shutter button 103 is pressed halfway, the system control unit 207 starts an autofocus (AF) process, an auto exposure (AE) process, an automatic white balance (AWB) process, and the like. When the shutter button 103 is fully pressed, the system control unit 207 starts an image capture process. Consequently, the digital image data generated in the image processing unit 204 is stored in the memory 208.

The USB interface unit 108 is connected to a communication unit 209 and a power receiving unit 210. The communication unit 209 can perform data communication with an external apparatus connected to the USB interface unit 108. The power receiving unit 210 can receive power supplied from the external apparatus connected to the USB interface unit 108. In a case where the USB interface unit 108 is in accordance with USB 2.0, the USB interface unit 108 can draw a current at a maximum of 500 mA from the external apparatus after an enumeration in accordance with the USB standard is normally completed. In a case where the USB interface unit 108 is in accordance with USB 3.1, the USB interface unit 108 can draw a current at a maximum of 900 mA from the external apparatus after an enumeration in accordance with the USB standard is normally completed.

A distribution unit 211 is configured to supply power to a power supply unit 212 and a power supply control unit 213, the power including power output from the battery 106 and power supplied to the distribution unit 211 from the power receiving unit 210. The distribution unit 211 includes a charge control circuit for charging the battery 106. Even when the electronic apparatus 100 is in a power off state, the distribution unit 211 can charge the battery 106 using power supplied from the power receiving unit 210.

The power supply control unit 213 is configured to be able to control supply of power from the power supply unit 212 to the components. The power supply unit 212 is configured to be able to supply power supplied from the distribution unit 211 to the components including the system control unit 207 and the communication unit 209.

Figure 3:
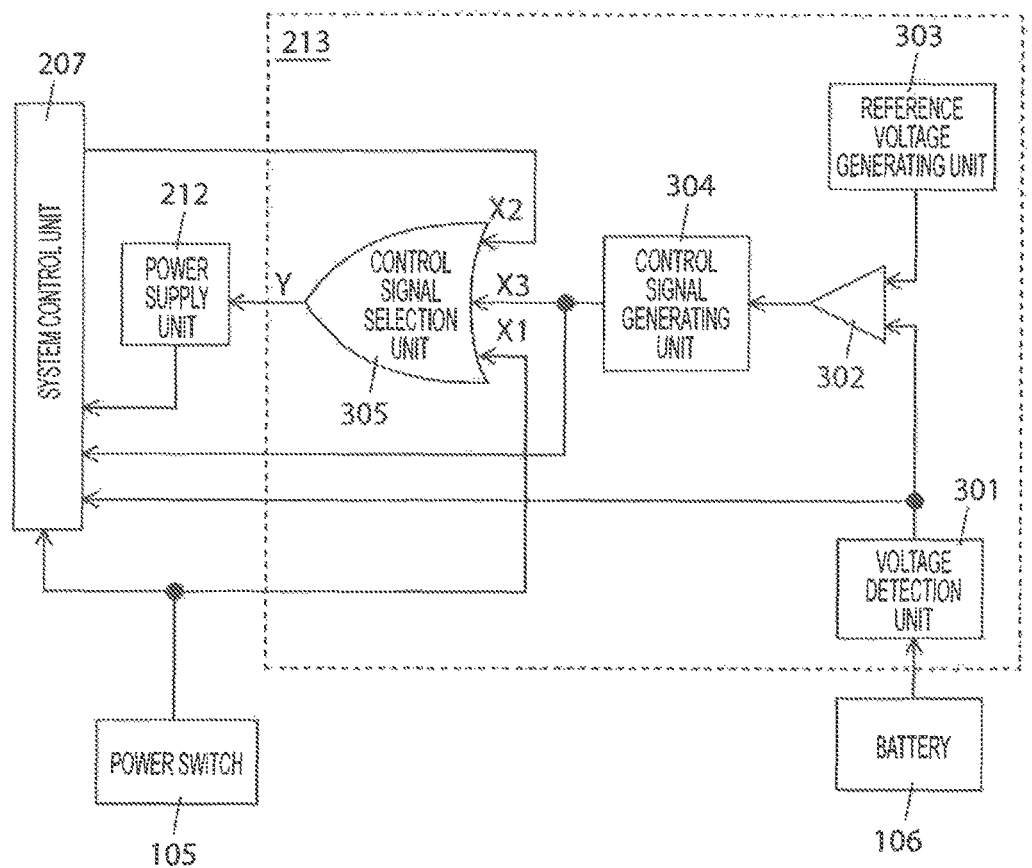
FIG. 3 is a block diagram for explaining an example of components included in a power supply control unit 213.

FIG. 3 is a block diagram for explaining an example of components included in the power supply control unit 213. The power supply control unit 213 includes a voltage detection unit 301, a voltage comparison unit 302, a reference voltage generating unit 303, a control signal generating unit 304, and a control signal selection unit 305. A part of the components included in the power supply control unit 213 has a hardware configuration.

The voltage detection unit 301 detects an output voltage of the battery 106 supplied from the battery 106 to the power supply control unit 213, and outputs the detected voltage to the system control unit 207 and the voltage comparison unit 302. The voltage detection unit 301 preferably supplies the detected voltage to the system control unit 207 for a period of time while the power supply unit 212 is supplying power to the system control unit 207. The voltage comparison unit 302 compares the detected voltage from the voltage detection unit 301 and the reference voltage from the reference voltage generating unit 303. The voltage comparison unit 302 supplies an H signal to the control signal generating unit 304 when the detected voltage is greater than the reference voltage, and supplies an L signal to the control signal generating unit 304 when the detected voltage is less than the reference voltage. Here the reference voltage is a voltage equivalent to a remaining capacity of the battery 106 sufficient for the communication unit 209 to complete an enumeration only with output power of the battery 106.

The reference voltage generating unit 303 generates a reference voltage supplied to the voltage comparison unit 302. The control signal generating unit 304 includes a timer circuit for counting a predetermined period of time T1. The control signal generating unit 304 generates a control signal X3 (H signal or L signal), and supplies the generated control signal X3 (H signal or L signal) to the system control unit 207 and the control signal selection unit 305. The control signal generating unit 304 supplies the control signal X3 (H signal) to the system control unit 207 and the control signal selection unit 305 for a period of time until the predetermined period of time T1 elapses after the control signal generating unit 304 receives the H signal from the voltage comparison unit 302. The control signal generating unit 304 supplies the control signal X3 (L signal) to the system control unit 207 and the control signal selection unit 305 for a period of time other than the period of time until the predetermined period of time T1 elapses after the control signal generating unit 304 receives the H signal from the voltage comparison unit 302. It is preferable for the control signal generating unit 304 to supply the control signal X3 (H signal) to the system control unit 207 for a period of time until the predetermined period of time T1 elapses after the control signal generating unit 304 receives the H signal from the voltage comparison unit 302 and while the power supply unit 212 is supplying power to the system control unit 207.

To the control signal selection unit 305, a control signal X1 (H signal or L signal) generated in the power switch 105 is input from the power switch 105. When the power switch 105 is operated, the power switch 105 supplies the control signal X1 (H signal) to the system control unit 207 and the control signal selection unit 305 for a predetermined period of time. It is preferable for the power switch 105 to supply the control signal X1 (H signal) to the system control unit 207 for a period of time while the power supply unit 212 is supplying power to the system control unit 207.

To the control signal selection unit 305, a control signal X2 (H signal or L signal) generated in the system control unit 207 is input from the system control unit 207. The control signal X2 is a control signal for keeping the electronic apparatus 100 in a power on state. When it is desired to keep the electronic apparatus 100 in a power on state, the system control unit 207 supplies the control signal X2 (H signal) to the control signal selection unit 305. When it is desired to stop keeping the electronic apparatus 100 in a power on state, the system control unit 207 supplies the control signal X2 (L signal) to the control signal selection unit 305.

The control signal selection unit 305 generates a control signal Y (H signal or L signal). The control signal selection unit 305 keeps on supplying the control signal Y (L signal) to the power supply unit 212 as long as all of the control signals X1, X2, and X3 are L signals. The control signal selection unit 305 keeps on supplying the control signal Y (H signal) to the power supply unit 212 when any of the control signals X1, X2, and X3 is an H signal. The control signal selection unit 305 functions as a logical OR circuit which outputs a logical sum of the control signals X1, X2, and X3 from the power switch 105, the system control unit 207, and the control signal generating unit 304, respectively.

The power supply unit 212 supplies power supplied from the distribution unit 211 to the components including the system control unit 207 and the communication unit 209 for a period of time the control signal Y from the control signal selection unit 305 is an H signal.

FIG. 4 is a timing chart for explaining an example of a relationship between a control signal input to the control signal selection unit 305 and a control signal output from the control signal selection unit 305. Referring to FIG. 4, a description will be given for an example in which the control signal generating unit 304 outputs an L signal.

In FIG. 4, an input signal X1 corresponds to the control signal X1 input to the control signal selection unit 305 from the power switch 105. An input signal X2 corresponds to the control signal X2 input to the control signal selection unit 305 from the system control unit 207. An input signal X3 corresponds to the control signal X3 input to the control signal selection unit 305 from the control signal generating unit 304. An output signal Y corresponds to the control signal Y supplied to the power supply unit 212 from the control signal selection unit 305.

In a case where the power switch 105 is operated when the electronic apparatus 100 is in a power off state, the power switch 105 supplies the control signal X1 (H signal) to the system control unit 207 and the control signal selection unit 305 for a predetermined period of time. The control signal selection unit 305 which has received the control signal X1 (H signal) starts supplying the control signal Y (H signal) to the power supply unit 212. The power supply unit 212 which has received the control signal Y (H signal) starts supplying power to the components including the system control unit 207 and the communication unit 209. The system control unit 207 which has received power supplied from the power supply unit 212 performs a predetermined process for bringing the electronic apparatus 100 into a power on state, and starts supplying the control signal X2 (H signal) to the control signal selection unit 305. The system control unit 207 continuously supplies the control signal X2 (H signal) to the control signal selection unit 305 in order to keep the electronic apparatus 100 in the power on state.

In a case where the power switch 105 is operated when the electronic apparatus 100 is in a power on state, the power switch 105 supplies the control signal X1 (H signal) to the system control unit 207 and the control signal selection unit 305 for a predetermined period of time. In a case where the system control unit 207 detects that the control signal X1 from the power switch 105 has changed from an L signal to an H signal, the system control unit 207 performs a predetermined process for bringing the electronic apparatus 100 into a power off state. After performing the predetermined process for bringing the electronic apparatus 100 into a power off state, the system control unit 207 starts supplying the control signal X2 (L signal) to the control signal selection unit 305. When all of the control signals X1, X2, and X3 become L signals, the control signal selection unit 305 starts supplying the control signal Y (L signal) to the power supply unit 212. The power supply unit 212 which has received the control signal Y (L signal) stops supplying power to the components including the system control unit 207 and the communication unit 209. Consequently, the electronic apparatus 100 is brought into a power off state.

FIG. 5 is a timing chart for explaining another example of the relationship between a control signal input to the control signal selection unit 305 and a control signal output from the control signal selection unit 305. Referring to FIG. 5, a description will be given for an example in which the control signal generating unit 304 outputs an H signal.

In FIG. 5, an input signal X1 corresponds to the control signal X1 input to the control signal selection unit 305 from the power switch 105. An input signal X2 corresponds to the control signal X2 input to the control signal selection unit 305 from the system control unit 207. An input signal X3 corresponds to the control signal X3 input to the control signal selection unit 305 from the control signal generating unit 304. An output signal Y corresponds to the control signal Y supplied to the power supply unit 212 from the control signal selection unit 305.

When an output voltage of the battery 106 is greater than the reference voltage, the control signal generating unit 304 receives an H signal from the voltage comparison unit 302. When the control signal generating unit 304 receives the H signal from the voltage comparison unit 302, the control signal generating unit 304 supplies the control signal X3 (H signal) to the system control unit 207 and the control signal selection unit 305 for a period of time until the predetermined period of time T1 elapses. The control signal selection unit 305 which has received the control signal X3 (H signal) starts supplying the control signal Y (H signal) to the power supply unit 212. The power supply unit 212 which has received the control signal Y (H signal) starts supplying power to the components including the system control unit 207 and the communication unit 209. The system control unit 207 which has received power supplied from the power supply unit 212 performs a predetermined process for bringing the electronic apparatus 100 into a power on state, and starts supplying the control signal X2 (H signal) to the control signal selection unit 305. The system control unit 207 continuously supplies the control signal X2 (H signal) to the control signal selection unit 305 in order to keep the electronic apparatus 100 in the power on state.

When the predetermined period of time T1 elapses, the control signal generating unit 304 supplies the control signal X3 (L signal) to the system control unit 207 and the control signal selection unit 305. However, even when the predetermined period of time T1 elapses, the system control unit 207 continuously supplies the control signal X2 (H signal) to the control signal selection unit 305 in order to keep the electronic apparatus 100 in the power on state. Therefore, even when the predetermined period of time T1 elapses, the control signal selection unit 305 can continuously supply the control signal Y (H signal) to the power supply unit 212. Consequently, even when the predetermined period of time T1 elapses, the power supply unit 212 can continue the supply of power to the components including the system control unit 207 and the communication unit 209.

In a case where the power switch 105 is operated when the electronic apparatus 100 is in a power on state, the power switch 105 supplies the control signal X1 (H signal) to the system control unit 207 and the control signal selection unit 305 for a predetermined period of time. In a case where the system control unit 207 detects that the control signal X1 from the power switch 105 has changed from an L signal to an H signal, the system control unit 207 performs a predetermined process for bringing the electronic apparatus 100 into a power off state. After performing the predetermined process for bringing the electronic apparatus 100 into a power off state, the system control unit 207 starts supplying the control signal X2 (L signal) to the control signal selection unit 305. When all of the control signals X1, X2, and X3 become L signals, the control signal selection unit 305 starts supplying the control signal Y (L signal) to the power supply unit 212. The power supply unit 212 which has received the control signal Y (L signal) stops supplying power to the components including the system control unit 207 and the communication unit 209. Consequently, the electronic apparatus 100 is brought into a power off state.

Figure 6:
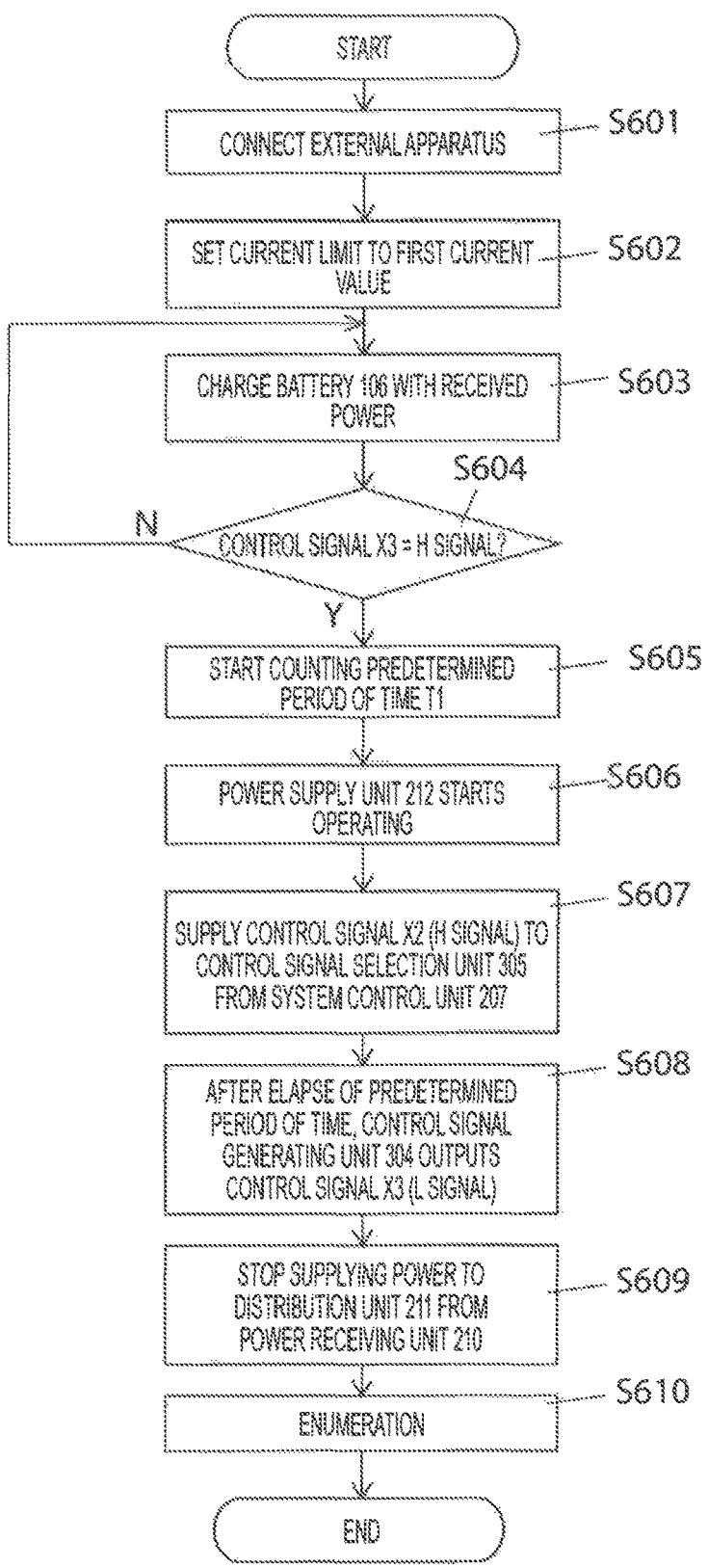
FIG. 6 is a flowchart for explaining an example of a control procedure performed when an external apparatus is connected to the electronic apparatus 100 in a power off state.

FIG. 6 is a flowchart for explaining an example of a control procedure performed when an external apparatus is connected to the electronic apparatus 100 in a power off state.

In Step S601, a user connects the external apparatus to the electronic apparatus 100. When the external apparatus is connected to the electronic apparatus 100, the power receiving unit 210 starts operating with power received from the external apparatus through the USB interface unit 108. Then, the power receiving unit 210 supplies power received from the external apparatus to the distribution unit 211.

In Step S602, the distribution unit 211 starts operating with power supplied to the distribution unit 211 from the power receiving unit 210, and sets a current limit of the power receiving unit 210 to a first current value. The first current value is, for example, a value not greater than 100 mA or 150 mA. By setting the current limit of the power receiving unit 210 to the first current value, the power receiving unit 210 can draw a current corresponding to a maximum of the first current value, from the external apparatus.

In Step S603, the distribution unit 211 starts charging the battery 106. Here, the distribution unit 211 charges the battery 106 with power received from the external apparatus.

In Step S604, the control signal generating unit 304 determines whether to supply the control signal X3 (H signal) to the system control unit 207 and the control signal selection unit 305. For example, when an output voltage of the battery 106 is greater than the reference voltage, the control signal generating unit 304 supplies the control signal X3 (H signal) to the system control unit 207 and the control signal selection unit 305. The control signal selection unit 305 which has received the control signal X3 (H signal) starts supplying the control signal Y (H signal) to the power supply unit 212. When the control signal selection unit 305 starts supplying the control signal Y (H signal) to the power supply unit 212, the process moves to Step S605 from Step S604 (Y in Step S604).

When the output voltage of the battery 106 is less than the reference voltage in Step S604, the control signal generating unit 304 supplies the control signal X3 (L signal) to the system control unit 207 and the control signal selection unit 305. The control signal selection unit 305 keeps on supplying the control signal Y (L signal) to the power supply unit 212 unless any of the control signals X1, X2, and X3 is an H signal. For a period of time while the control signal selection unit 305 is supplying the control signal Y (L signal) to the power supply unit 212, the process returns to Step S603 from Step S604 (N in Step S603) in order to continue to charge the battery 106. Accordingly, the distribution unit 211 can continue to charge the battery 106 for the period of time while the control signal selection unit 305 is supplying the control signal Y (L signal) to the power supply unit 212.

In Step S605, the control signal generating unit 304 starts counting the predetermined period of time T1. In Step S605, the distribution unit 211 stops charging the battery 106. In Step S605, the output power of the battery 106 is supplied to the distribution unit 211.

In Step S606, the power supply unit 212 which has received the control signal Y (H signal) starts operating with power supplied to the power supply unit 212 from the distribution unit 211. The power supply unit 212, which has started operating, starts supplying power to the components including the system control unit 207 and the communication unit 209.

In Step S607, the system control unit 207 starts operating with power supplied to the system control unit 207 from the power supply unit 212. The system control unit 207 which has started operating performs a predetermined process for bringing the electronic apparatus 100 into a power on state, and starts supplying the control signal X2 (H signal) to the control signal selection unit 305.

In Step S608, the control signal generating unit 304 determines whether the predetermined period of time T1 has elapsed. Then, after the elapse of the predetermined period of time T1, the control signal generating unit 304 starts supplying the control signal X3 (L signal) to the control signal selection unit 305.

In Step S609, the distribution unit 211 stops supplying power to the distribution unit 211 from the power receiving unit 210. Consequently, only the output power of the battery is supplied to the power supply unit 212 from the distribution unit 211. As a result, the communication unit 209 operates only with the output power of the battery 106.

In Step S610, the system control unit 207 instructs the communication unit 209 to start an enumeration. Consequently, the communication unit 209 performs the enumeration only with the output power of the battery 106. After the enumeration is completed, the distribution unit 211 changes the current limit of the power receiving unit 210 to a second current value from the first current value. The second current value is greater than the first current value, and is, for example, a value not greater than 500 mA or 900 mA.

As described above, the control signal generating unit 304 can supply the control signal Y (H signal) to the power supply unit 212 when any of the control signals X1, X2, and X3 is an H signal. Consequently, even when the electronic apparatus 100 is in a power off state, it is possible to start supplying power to the system control unit 207 and the communication unit 209 when the output voltage of the battery 106 is greater than the reference voltage. The communication unit 209 can operate only with the output power of the battery 106 to perform an enumeration. In other words, the communication unit 209 can perform an enumeration without using power received from the external apparatus.

The predetermined period of time T1 can be a period of time (about several tens to several hundreds of microseconds), which is longer than a period of time from when the power supply unit 212 starts operating to when the system control unit 207 supplies the control signal X2 (H signal) to the control signal selection unit 305. However, the predetermined period of time T1 can be shorter or longer than the above-described period of time.

As described above, the electronic apparatus 100 can perform an enumeration only with the output power of the battery 106 connected to the electronic apparatus 100. In other words, the electronic apparatus 100 can perform an enumeration without using power received from the external apparatus. Consequently, the electronic apparatus 100 can complete an enumeration without causing a failure in the system control unit 207. As a result, the electronic apparatus 100 can draw a current at a maximum of 500 mA (in a case of USB 2.0) or at a maximum of 900 mA (in a case of USB 3.1) from the external apparatus after the enumeration, and can charge the battery 106 with a desired current value.

Second Embodiment

The various functions, processes, and methods described in the first embodiment can also be realized by a personal computer, a microcomputer, a central processing unit (CPU) or the like using a program. In a second embodiment, a personal computer, a microcomputer, a CPU and the like are referred to as "computer X". In addition, in the second embodiment, a program, which is a program for realizing the various functions, processes, and methods described in the first embodiment for controlling computer X is referred to as "program Y".

The various functions, processes, and methods described in the first embodiment are realized by computer X executing program Y. In that case, program Y is supplied to computer X through a computer-readable storage medium. The computer-readable storage medium in the second embodiment includes at least one of a hard disk device, a magnetic storage device, an optical storage device, a magneto-optical storage device, a memory card, a volatile memory, a non-volatile memory, etc. The computer-readable storage medium in the second embodiment is a non-transitory storage medium.

While aspects of the present invention are described with reference to exemplary embodiments, it is to be understood that the aspects of the present invention are not limited to the exemplary embodiments. The scope of the following claims is to be accorded the broadest interpretation so as to encompass all modifications and equivalent structures.

This application claims priority from Japanese Patent Application No. 2015-164470, filed Aug. 24, 2015, which is hereby incorporated by reference herein in its entirety.

What is claimed is:

1. An electronic apparatus comprising:
   a power receiving unit that receives power from an external apparatus connected to an interface unit;
   a first generating unit that generates a first control signal;
   a second generating unit that generates a second control signal;
   a third generating unit that generates a third control signal, the third control signal being changed into a high state when an output voltage of a battery is greater than a reference voltage;
   a fourth generating unit that generates a fourth control signal using the first control signal, the second control signal, and the third control signal, the fourth control signal being changed into a high state when the first control signal, the second control signal, or the third control signal is changed into a high state;
   a charge control unit that charges the battery with power received from the external apparatus when the fourth control signal is in a low state, and stops charging the battery when the fourth control signal is in a high state; and
   a power supply unit that starts supplying power from the battery to the second generating unit when the fourth control signal is changed into a high state,
   wherein, when the third control signal is changed into a high state, the third control signal is supplied to the second generating unit and the fourth generating unit until a predetermined period of time elapses, and
   wherein, when the third control signal is changed into a high state, the fourth control signal is changed into a high state, and supply of power from the battery to the second generating unit is started, the second generating unit performs a process for changing the electronic apparatus into a power on state from a power off state, changes the second control signal into a high state before the predetermined period of time elapses, and continuously supplies the second control signal to the forth generating unit so as to keep the electronic apparatus in the power on state.

2. The electronic apparatus according to claim 1, wherein the fourth control signal is changed into a low state when the first control signal, the second control signal, and the third control signal are changed into a low state.

3. The electronic apparatus according to claim 1, wherein the reference voltage is a voltage equivalent to a remaining capacity of the battery sufficient to perform an enumeration.

4. The electronic apparatus according to claim 1, wherein the second generating unit includes a system control unit that controls components of the electronic apparatus.

5. The electronic apparatus according to claim 1, further comprising:
   a communication unit that communicates with the external apparatus connected to the interface unit,
   wherein, when the fourth control signal is changed into a high state, the power supply unit starts supplying power from the battery to the communication unit.

6. The electronic apparatus according to claim 1, wherein the interface unit is in accordance with a universal serial bus standard.

7. The electronic apparatus according to claim 1, wherein the external apparatus is configured to act as a host apparatus or a power supply apparatus.

8. The electronic apparatus according to claim 1, wherein the electronic apparatus is configured to act as an image capture apparatus.

9. The electronic apparatus according to claim 1, wherein the electronic apparatus is configured to act as a phone.

10. A method comprising:
    receiving power from an external apparatus connected to an interface unit;
    generating a first control signal, the first control signal being generated in a first generating unit;
    generating a second control signal, the second control signal being generated in a second generating unit;
    generating a third control signal, the third control signal being generated in a third generating unit, and the third control signal being changed into a high state when an output voltage of a battery greater than a reference voltage;

generating a fourth control signal using the first control signal, the second control signal, and the third control signal, the fourth control signal being changed into a high state when the first control signal, the second control signal, or the third control signal is changed into a high state;

charging the battery with power received from the external apparatus when the fourth control signal is in a low state;

stopping charging the battery when the fourth control signal is in a high state; and starting supplying power from the battery to the second generating unit when the fourth control signal is changed into a high state, wherein, when the third control signal is changed into a high state, the third control signal is supplied to the second generating unit and the fourth generating unit until a predetermined period of time elapses, and wherein, when the third control signal is changed into a high state, the fourth control signal is changed into a high state, and supply of power from the battery to the second generating unit is started, the second generating unit performs a process for changing an electronic apparatus into a power on state from a power off state, changes the second control signal into a high state before the predetermined period of time elapses, and continuously supplies the second control signal to the forth generating unit so as to keep the electronic apparatus in the power on state.

11. The method according to claim 10, wherein the fourth control signal is changed into a low state when the first control signal, the second control signal, and the third control signal are changed into a low state.

12. The method according to claim 10, wherein the reference voltage is a voltage equivalent to a remaining capacity of the battery sufficient to perform an enumeration.

13. The method according to claim 10, wherein the second generating unit includes a system control unit that controls components of the electronic apparatus.

14. The method according to claim 10, further comprising starting supplying power from the battery to a communication unit when the fourth control signal is changed into a high state, wherein the communication unit is used to communicate with the external apparatus connected to the interface unit.

15. The method according to claim 10, wherein the interface unit is in accordance with a universal serial bus standard.

16. The method according to claim 10, wherein the external apparatus is configured to act as a host apparatus or a power supply apparatus.

17. The method according to claim 10, wherein the electronic apparatus is configured to act as an image capture apparatus.

18. The method according to claim 10, wherein the electronic apparatus is configured to act as a phone.

19. A non-transitory storage medium that stores a program causing a computer to execute a method, the method comprising:

receiving power from an external apparatus connected to an interface unit;

generating a first control signal, the first control signal being generated in a first generating unit;

generating a second control signal, the second control signal being generated in a second generating unit;

generating a third control signal, the third control signal being generated in a third generating unit, and the third control signal being changed into a high state when an output voltage of a battery greater than a reference voltage;

generating a fourth control signal using the first control signal, the second control signal, and the third control signal, the fourth control signal being changed into a high state when the first control signal, the second control signal, or the third control signal is changed into a high state;

charging the battery with power received from the external apparatus when the fourth control signal is in a low state;

stopping charging the battery when the fourth control signal is in a high state; and starting supplying power from the battery to the second generating unit when the fourth control signal is changed into a high state, wherein, when the third control signal is changed into a high state, the third control signal is supplied to the second generating unit and the fourth generating unit until a predetermined period of time elapses, and wherein, when the third control signal is changed into a high state, the fourth control signal is changed into a high state, and supply of power from the battery to the second generating unit is started, the second generating unit performs a process for changing an electronic apparatus into a power on state from a power off state, changes the second control signal into a high state before the predetermined period of time elapses, and continuously supplies the second control signal to the forth generating unit so as to keep the electronic apparatus in the power on state.

* * * * *